United States Patent
Duffy et al.

[15] 3,696,308
[45] Oct. 3, 1972

[54] SEGMENTED LASER APPARATUS AND METHOD OF MAKING THE SAME

[72] Inventors: Joseph J. Duffy, Northport; Alexander S. Dunbar, Plainview, both of N.Y.

[73] Assignee: Hadron Inc., Westbury, N.Y.

[22] Filed: Aug. 21, 1970

[21] Appl. No.: 65,794

[52] U.S. Cl.................................................331/94.5
[51] Int. Cl...............................................H01s 3/06
[58] Field of Search.....................331/94.5; 330/4.3

[56] References Cited

UNITED STATES PATENTS

| | | |
|---|---|---|
| 3,487,330 | 12/1969 | Gudmundsen............331/94.5 |
| 3,500,231 | 3/1970 | Tomiyasu et al. ........331/94.5 |
| 3,569,860 | 3/1971 | Booth.......................331/94.5 |

*Primary Examiner*—William L. Sikes
*Attorney*—Yuter & Fields

[57] ABSTRACT

The apparatus comprises an outer jacket having a through bore which receives a plurality of laser discs therein. Spacing pins are provided between adjacent discs for spacing adjacent discs apart. Opposite edges of alternate discs are spaced from the wall of the bore to define fluid passages therebetween. Retaining means are sealingly received in each end of the jacket for retaining the laser discs within the jacket and for providing for the flow of energy and a fluid in and out of said jacket.

The method includes forming a laser rod to a preselected diameter, removing a portion of the rod to provide a relieved surface and cutting the rod into a plurality of laser discs. The discs are placed into a jacket to provide the laser apparatus.

16 Claims, 6 Drawing Figures

INVENTORS
JOSEPH J. DUFFY
ALEXANDER S. DUNBAR
BY Yuter & Fields
ATTORNEYS

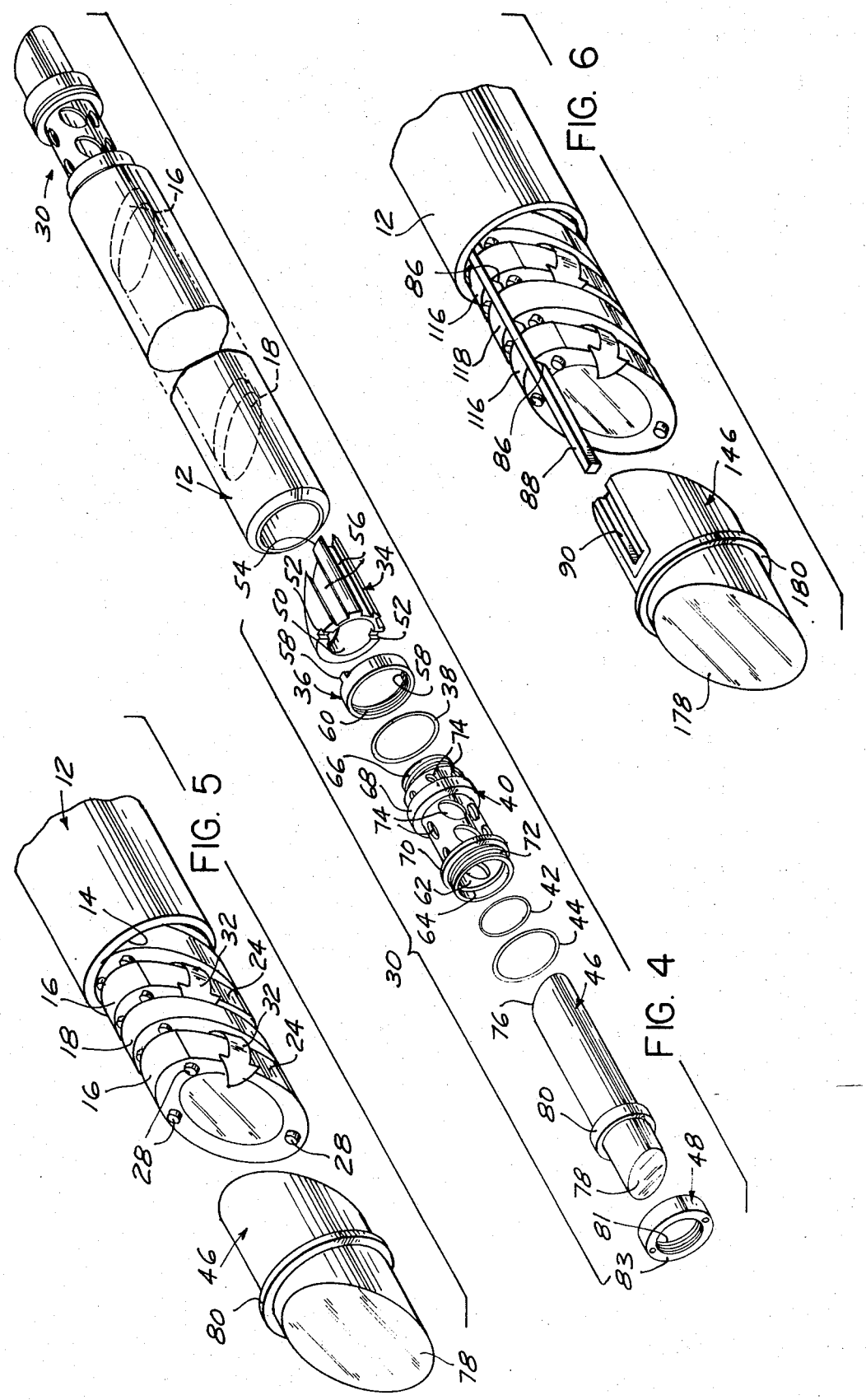

SEGMENTED LASER APPARATUS AND METHOD OF MAKING THE SAME

The present invention relates generally to a laser construction and a method of making the same and, more particularly, pertains to an efficient segmented laser apparatus and to a method of fabricating the same.

As the use of laser apparatus becomes more and more widespread, the demand for high power performance from laser systems continuously increases. However, problems such as thermal-optical distortion, and reduced efficiency arise in attempting to utilize laser systems at high average powers. Moreover, in many cases extreme stresses are set up in the laser rod which have caused the rod to fracture. The apparent source of most of these problems is the variation of thermal gradients in the system. More specifically, when a solid laser rod is cooled, the temperature of the surface adjacent to the coolant will obviously be lower than the surface further away from the coolant, thereby causing wide variations in thermal gradients within the rod which, in turn, cause optical deterioration and consequent fracture.

In order to ameliorate the situation, it has been proposed to utilize a plurality of discs as the laser rather than a solid rod, and to cool each disc by causing a coolant to flow over the surfaces of the discs. Alternatively, it has been proposed to place the adjacent discs in spaced relationship to each other with a suitable cooling fluid therebetween. These types of laser constructions, which are referred to as a segmented or, alternatively, an axial-gradient laser, substantially eliminates radial distortion of the beam and separates the laser aperture from its heat-transfer characteristics thereby permitting each characteristic to be compensated for individually. While such segmented laser systems permit lasers to be operated at higher average powers than solid rod laser systems, there are still many problems associated with fabricating such constructions.

Foremost among these problems is the problem of maintaining the discs in position with respect to each other and with respect to the optical axis of the laser and, at the same time, to eliminate any strain on the discs caused by the holding or aligning structure. Consequently, many such holding structures have been proposed but each one has some type of disadvantage associated with its use such as: failure to maintain the discs in their precise orientation, too complex a structure, or the system simply is not economical to fabricate. Another problem involves providing means for the introduction of the fluid or coolant into the laser array. Additionally, most segmented lasers must be handled very carefully or the discs may be knocked out of alignment by the slightest jar. This obviously places a severe limitation on the system since even the mounting of the array may cause misalignment of the discs.

Accordingly, it is an object of the present invention to provide an improved segmented laser apparatus.

A more specific object of this aspect of the invention is to provide a segmented laser apparatus in which the laser discs are reliably maintained in a preselected orientation with respect to each other along the optical axis of the laser.

Another object of the invention resides in the novel details of construction which provide a laser apparatus of the type described which may be handled in the same manner as a solid rod laser thereby reducing the stringent handling requirements for such devices.

A further object of the invention is the provision of an efficient and economic segmented laser apparatus.

Another object of this invention is the provision of a high average power output segmented laser apparatus.

Accordingly, a segmented laser apparatus constructed according to the present invention comprises an outer jacket having an inner wall defining a through bore. A plurality of laser discs are received in said through bore and spacing means is provided between adjacent ones of said plurality of discs for maintaining the discs in spaced relationship to each other. The plurality of discs are sized and positioned so that opposite portions of alternate ones of the plurality of discs are spaced from the wall to define fluid paths therebetween. Retaining means is sealingly received in at least one end of the jacket for retaining the plurality of laser discs therein.

At present, many methods are utilized to fabricate segmented laser apparatus. However, these methods have disadvantages associated with their use such as poor quality control, use of complex equipment and high cost.

Accordingly, it is an object of this invention to provide an improved method for fabricating a segmented laser apparatus.

A more specific object of this aspect of the invention is to provide a method for accurately producing the laser discs comprising the segmented laser apparatus of the invention.

Another object of the invention is to provide a method for fabricating a segmented laser apparatus which is relatively simple to perform.

Accordingly, a method for fabricating a segmented laser in accordance with the present invention comprises forming a laser rod to a preselected diameter. A portion of the rod is removed to provide a relieved surface on the rod and the rod is cut into a plurality of discs.

Other features and advantages of the present invention will become more apparent from a consideration of the following detailed description when taken in conjunction with the accompanying drawings, in which:

FIG. 4 is an exploded view, with parts broken away, of the laser apparatus of FIG. 1 illustrating the retaining portion of the apparatus in detail;

FIG. 5 is a diagrammatic view of the laser apparatus illustrating the path of fluid flow across the face of the discs; and FIG. 6 is a diagrammatic view of a modified embodiment of a laser apparatus illustrating a modified arrangement for maintaining the discs in alignment.

In the discussion which follows, reference will be made to various materials which were utilized for fabricating an actual model of the laser construction under consideration. However, it is to be noted that these references to materials are for illustrative purposes only and are not to be interpreted as being a limitation on the present invention. To be more specific, the active laser portion of the laser discs described hereinbelow comprise lithia-alumina silicate glass which is doped with 3 percent neodymium. This material is manufactured by the Owens-Illinois, Inc. and is sold under the brand designation ED-2 laser glass. However, any other type of laser mediums such as glass, ruby, YAG, and the like can be utilized, depending upon the energy output and wave length requirements.

Figure 1:
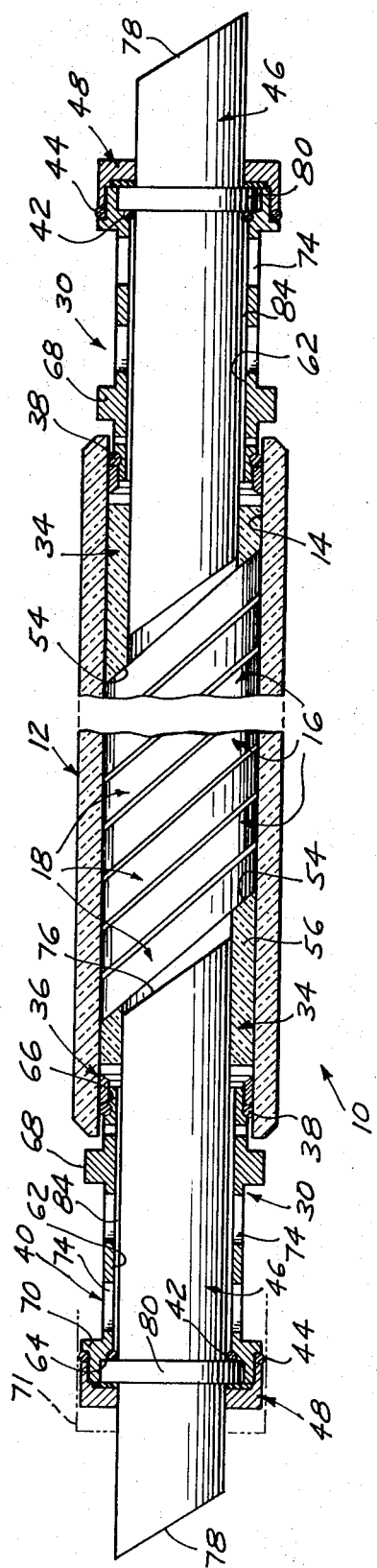
FIG. 1 is a vertical sectional view, with parts broken away, of a segmented laser apparatus constructed according to the present invention.

A segmented laser apparatus constructed according to the present invention is illustrated in FIG. 1 and is designated generally by the reference numeral 10. The apparatus includes an outer jacket 12 having a central through bore 14. The outer jacket 12 may be fabricated from any material which will withstand laser pumping, such as Pyrex or the like. However, in order to provide a relatively strong supporting tube or jacket for the laser discs, the jacket 12 may be fabricated from a glass such as ED-4 glass manufactured by Owens-Illinois, Inc. The ED-4 glass is the same basic composition as the ED-2 laser glass mentioned above, but is devoid of any neodymium. Alternatively, the jacket may be fabricated from an ED-4S glass which is a high-strength form of ED-4 material. In practice, a solid rod of ED-4 or ED-4S glass is drilled so that the through bore 14 is of a preselected diameter. Thereafter, the bore is ground and polished to a selected diameter. As noted hereinabove, this example of forming the outer jacket is for illustrative purposes only as any tube may be utilized for the outer jacket.

Figure 3:
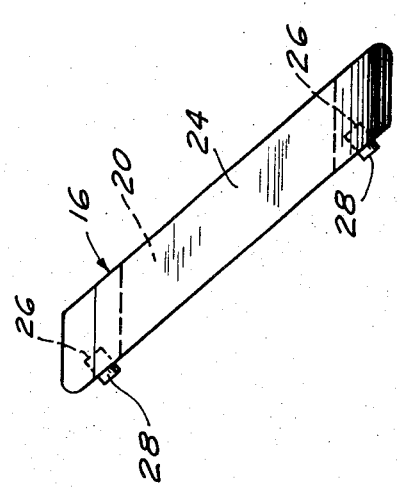
FIG. 3 is a side elevational view thereof.
Figure 2:
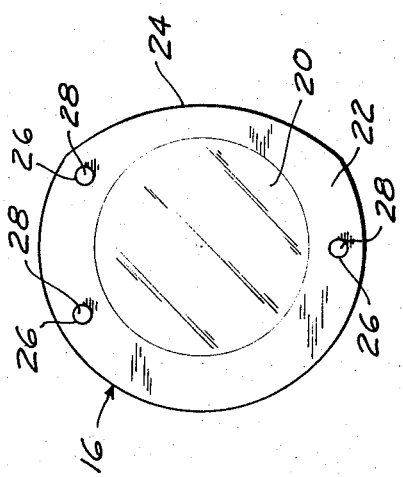
FIG. 2 is a front elevational view of a right-hand laser disc of the type shown in FIG. 1.

Received within the jacket 12 are a plurality of right-hand laser discs 16 which alternate with a like plurality of left-hand laser discs 18. The right-hand laser discs 16 are identical in construction and are shown in greater detail in FIGS. 2 and 3. More specifically, the laser disc 16 shown in these FIGS. comprises an inner optical portion 20 fabricated from ED-4 laser glass, in the example chosen. Surrounding the inner active portion is an integral outer inactive portion 22 or so-called cladding which is of ED-4 material. The inner portion 20 is the active laser portion of the laser discs while the outer inactive portion 22 serves to support the laser portion. As shown in FIG. 2, the right-hand edge 24 of the disc 16 is relieved for reasons which will become apparent from a consideration of the discussion below.

In practice, the discs 16 are fabricated from a solid laser rod. To be more specific, the outside diameter of the rod is obtained by centerless grinding of the rod to the desired diameter. In order to obtain the relieved edge 24, the solid rod is moved to a new center positioned to the left of the geometric center so that the geometric center of the rod is off-center with respect to the grinding device. The rod is then ground while in this off-center position to obtain the relieved edge. It is to be noted that in addition to forming the relieved edge, a blending operation is simultaneously obtained. Moreover, this procedure ensures that each disc cut from the laser rod has an identical cross-section.

The rod is then sliced or cut at a preselected angle with respect to the geometric axis of the rod to form each one of the laser discs 16. The actual angle at which the discs are cut is determined by the respective indices of refraction at the interface between the laser disc and the fluid in which the disc is to be placed at the wavelength of interest. In other words, it is desirable that light enter and leave each disc at Brewster's angle to substantially eliminate reflection losses. In addition, the average direction of propagation of the beam should be along the laser axis in order to avoid walk-off losses. Thus, the effects of the refraction which occurs due to the beam entering the discs at Brewsters angle must also be compensated. The light thus follows essentially a zig-zag path through the assembly. This angle is easily calculated from the relationship:

$$\alpha = \tan^{-1}\left(\frac{A^{n_w/n_g} + B^{n_g/n_w}}{A+B}\right)$$

where:

$A$ is the thickness of each disc;
$B$ is the thickness of the fluid separating the discs;
$n_w$ is the index of refraction of the fluid;
$n_g$ is the index of refraction of the laser glass; and
$\alpha$ is the angle at which the discs are cut with respect to the geometric axis of the rod.

After each laser disc has been cut from the rod the faces of the discs are polished. Additionally, the edges formed at the juncture of the cylindrical edges and the faces of the disc are blended to form a smooth curve with a preselected radius of curvature. This blending may be performed by a grinding operation or the like. Additionally, the faces of each disc are cut so that the faces are substantially parallel to each other.

The left-hand discs 18 are formed in substantially the same manner as the right-hand discs 16, except that the rods from which the discs 18 are cut are remounted on a center which is located to the right of the geometric center of the rod to obtain the relieved edge rather than to the left of the geometric center of the rod as is the case with the right-hand discs 16. Alternatively, a single rod may be utilized for the right- and left-hand discs. However, for this latter case, the right-hand and left-hand discs would be cut at a complementary angle with respect to the geometric axis of the rod so that when positioned correctly within the outer jacket 12, the discs will be oriented at the correct angles to prevent beam walk-off.

It is to be noted that the discs 16 and 18 and the inner bore 14 of the jacket 12 are sized so that when the discs are received within the bore 14, they will be in sliding engagement with the walls thereof, except for the relieved edges which will be spaced therefrom to provide for the flow of a cooling fluid, as noted below.

The laser discs 16 and 18 are spaced from each other by spacing means to provide a path for the flow of the fluid across the faces of each disc. To be more specific, after the faces of the discs have been polished, three circumferentially spaced bores 26 are provided in the cladding portion 22 of the material, as shown in FIG. 2. The bores 26 are positioned so that the axis of each one of the bores will be substantially perpendicular to the face of the disc. Received within the bores 26 are respective pins 28. In practice, the pins 28 may be fabricated from the same material as the cladding 22 of the laser discs. The external ends of the pins 28 are then ground and polished to a common plane which is a preselected height above the face of the disc and is parallel to the disc faces. Accordingly, the pins 28 provide a three-point support for adjacent discs of the apparatus.

It will now be obvious that the spacing means comprising the bores 26 and the pins 28 and the sliding engagement between the discs 16 and 18 and the walls defining the bore 14 maintain the laser discs 16 and 18 in proper rotational alignment with respect to the geometrical axis of the laser array or apparatus. To be more specific, when each one of the discs is properly located within the jacket 12 at the desired angle of inclination to the geometrical axis, adjacent discs will rest on the three-point support provided by the pins 28 of the preceding disc. However, if there is any rotational misalignment of the discs, the discs will tend to move away from their common three-point support. Thus, to ensure that the discs are properly rotationally aligned, they are placed into the outer jacket 12 and a slight pressure is applied to the outermost discs to move all discs into rotational alignment. The discs are then maintained in this rotational alignment by retaining means, designated generally by the reference number 30, which is received in each end of the jacket 12.

As noted hereinabove, a major advantage of a segmented laser apparatus is that each disc may be cooled by a suitable coolant thereby permitting the apparatus to be operated at higher power levels. Thus, as shown in FIG. 5, the space between each disc provided by the pins 28 permits a coolant to flow across the faces of juxtaposed discs. Moreover, as noted hereinabove, opposite edges of alternate discs are relieved to provide paths for fluid or coolant to flow between the relieved edge of the disc and the wall defining the bore 14 of the jacket 12. Thus, coolant or fluid flow through the jacket 12 will be from a relieved section or edge of a disc, across the faces of adjacent discs, and around the relieved edge on the opposite side of the adjacent disc. That is, as shown by the arrowheads 32 in FIG. 5, fluid flow will be around a relieved edge 24 of a right-hand disc, across the faces of the juxtaposed discs, and around the opposite relieved edge of the adjacent left-hand disc to provide an efficient and effective means of cooling the laser discs.

The retaining device 30 is shown in detail in FIG. 4 and functions to permit energy to both enter and leave the laser discs or array in the jacket 12 and, in addition, provides the means for the entrance and exit of the cooling fluid which flows through the cavity or bore 14. The retaining device 30 comprises the following elements (which are described in greater detail hereinbelow): a stop and readout pilot 34, a stop lockring 36, an O-ring 38, a prism holder 40, O-rings 42 and 44, a prism 46, and a prism lockring 48.

The stop and readout pilot 34 is provided with a through bore 50 and diametrically opposed open-ended slots or notches 52 in the outer edge of the pilot. Additionally, the inner edge 54 is formed at an angle with respect to the axis of the pilot to conform to the angulation of the laser discs 16 and 18. In other words, the inner edges 54 of the pilots at each end of the laser array of discs are at an angle such that the discs will be maintained in their proper preselected angulation with respect to the geometric axis of the laser when the pilots 34 are received in the jacket 12. Additionally, longitudinally extending grooves 56 are provided in the outer surface of the pilots 34 to provide for the flow of the fluid. Alternatively, the stop and readout pilots 34 may be provided with relieved edges similarly to the discs 16 and 18 so that the fluid may flow between the respective pilots and the wall defining the bore 14. The pilots 34 are sized so that they slidably engage the wall defining the bore 14 and the bore 50 is sized so that the prism 46 is slidably received therein.

The stop lockring 36 includes rearwardly extending projections 58 which are adapted to be received in the respective notches 52 in the pilot 34. Additionally, the stop lockring 36 is internally threaded at 60 to engage a complementary threaded portion of the prism holder 40. The stop lockring 36 and the pilots 34 provide a stop means to receive the prism holder 40. In other words, the pilot 34 will be maintained in proper orientation because of the angulation of the edge 54 in contact with the angulated laser discs. Additionally, since the stop lockring 36 is seated in the notches 52 in the pilot, the lockring similarly will be maintained nonrotatable within the jacket 12. Hence, the lockring and the pilot provide a seat for the prism holder 40, as noted in greater detail below. The pilot 34, in practice, may be fabricated from the same material as the jacket 12.

The elements 40-48 provide a prism means which permits energy to flow to and from the laser discs by means of the prism 46 and also provides a mount for the prism. More specifically, the prism holder 40 includes a central through bore 62 which is of slightly greater diameter than the prism 46. Additionally, a shelf 64 is provided in the bore 62 to provide a seat for the prism 46, as noted hereinbelow. The inner end 66 of the holder 40 is of reduced diameter and is provided with external threads to threadably engage the threaded portion 60 of the lockring 36. Spaced radially extending flanges 68 and 70 are provided on the outer surface of the holder. The flange 68 is positioned so that it will be spaced slightly beyond the edge of the jacket 12 when the holder 40 is in position. The outer end 72 of the holder 40 is externally threaded to receive a complementary threaded portion of the prism lockring 48. A plurality of spaced apertures 74 are provided through the wall of the holder 14 to permit fluid flow from the exterior to the interior of the holder.

The prism 46, in practice, is fabricated from the same material as the cladding 22. In other words, in the example under consideration, the prism 46 is fabricated from ED-4 glass. Hence, the rear face 76 of the prism 46 is formed substantially at Brewster's angle to the geometric axis of the prism as determined by the indices of refraction of both the prism and the coolant at the interface of the face 76 and the coolant medium. However, in order to compensate for any beam walk-off which may be present from disc to disc in the laser array, the angle at which the face 76 is formed may be slightly in excess of Brewster's angle. On the other hand, the outer face 78 of the prism is formed at Brewster's angle with respect to the geometric axis of the prism as determined by the indices of refraction of the prism and the fluid in which the outer face is in contact. In practice, it is to be noted that the outer face 78 will usually be in contact with air.

A radially extending flange 80 is provided on the prism which is positioned adjacent the outer face 78 of the prism. The flange 80 is sized and positioned so that it will seat on the shelf 64 in the bore 62. As noted hereinabove, the diameter of the prism 46 is slightly less than the diameter of the bore 62 in the prism holder 40. However, flange 80 is sized so that the prism will be coaxial with the prism holder 40 when the prism is in position so that an annular space 84 (FIG. 1) will be formed between the outer surface of the prism 46 and the inner surface defining the bore 62 of the holder 40. The length of the prism 46 beyond the flange 80 is such that the prism will not extend beyond the inner edge of the pilot 34.

The prism lockring 48 is internally threaded at 81 to engage the threaded outer end 72 of the holder 40. Moreover, the outer edge of the lockring is provided with a radially inwardly extending wall 83 which is adapted to engage the flange 80 of the prism to force the prism flange 80 rearwardly into abutment with the shelf 64 so that the prism is maintained non-rotatable within the holder 40.

It is to be noted that alternatively the face 78 may be a plane-parallel outer face.

In the description of assembling the retaining device 30, only one retaining device 30 will be referred to. However, it is to be understood that the retaining device at the other end of the jacket 12 will be assembled in a similar manner. Accordingly, after the laser discs 16 and 18 have been centrally positioned in the jacket 12 in the manner noted hereinabove, the stop and readout pilot 34 is inserted and is rotated to the correct position to maintain the discs in their proper orientation and alignment. Thereafter, the stop lockring 36 is inserted into the jacket 12 so that the projections 58 are engaged in the notches 52. The O-ring 38 is placed on the reduced diameter inner end 66 of the prism holder and the end 66 is threadedly engaged in the portion 60 of the lockring. The O-ring 38 is compressed between the shelf formed by the reduced diameter end portion 66 and the surface of the holder 40 and the outer end of the lockring 36 as shown in FIG. 1. Accordingly, expansion of the O-ring 38 causes the O-ring to engage the inner wall of the bore 40 with sufficient pressure to lock both the discs 16 and 18 and the stop pilot 34 in place within the jacket tube. Moreover, it will be noted that the O-ring 38 also functions to substantially provide a fluid-tight seal in the jacket 12 to prevent fluid from flowing around the pilot 34 and thereby, out of the jacket. As noted above and as shown in FIG. 1, the flange 68 is spaced beyond the edge of the jacket 12 and is adapted to be engaged by an appropriate end-plate (not shown) when the apparatus is mounted within a laser system.

The O-ring 42 is placed on the prism 46 in abutment with the rear surface of flange 80. The prism 46 is then inserted into the bore 62 until the flange 80 is seated on the shelf 64. It is to be understood that the O-ring 42 is received between the flange 80 and the shelf 64. The O-ring 44 is placed on the other end 72 of the holder 40 against the flange 70. The prism lockring 48 is then threadedly engaged on the threaded end 72 of the holder 40. The wall 83 engages the flange 80 and exerts a rearward pressure against the flange 80 to cause the O-rings 42 and 44 to seal at their respective points. In other words, the O-ring 42 effectively provides a seal between the flange 80 and the shelf 64, whereas the O-ring 44 provides a seal between the edge of the lockring 48 and the flange 70 and the wall of a through-bore in a laser head end cap indicated by the dashed lines 71 which forms a part of the head mounting assembly (not shown). At this point, the prism lockring 48 may be loosened to permit the prism 46 to be rotated to the correct orientation. Thereafter, the lockring 48 is tightened to maintain the prism in this orientation.

In its assembled condition, as shown in FIG. 1, the laser apparatus 10 of the present invention may be handled in the same manner and fashion as a solid laser rod. That is, the retaining means or device 30 maintains the discs 16 and 18 immovable within the outer jacket 12 so that the discs cannot fall out of alignment. The same comments apply to the prism 46 which are securely locked in place by the respective lockrings. Accordingly, the laser apparatus 10 may now be mounted in a conventional laser head and utilized in the same manner as any solid laser rod. That is, energy may be pumped into the jacket 12 in the conventional manner and exit through the prisms 46. Additionally, a coolant fluid may be introduced into the jacket 12 through the apertures 74 in the prism holder 40. The coolant flows through the annular space 84 and through the grooves 56 in the pilot 34 into the jacket 12. Fluid flow is around the edges and across the spaces between the discs as noted hereinabove in the description of FIG. 5. The fluid exits through the grooves 56 in the opposite retaining device 30 and the space 82 therein and, finally, through the apertures 74 in the opposite holder 40.

Accordingly, a segmented laser apparatus has been disclosed which is easy to fabricate and which is highly efficient in operation. It should be noted that a model of the subject laser apparatus has been constructed utilizing the materials noted above and with the following specifications:

| | |
|---|---|
| Coolant fluid | Deuterium oxide |
| Wavelength operation of laser | 1.06 microns |
| Diameter of active portion 20 of disc | ¾ inches |
| Thickness of inactive cladding portion 22 | 3/16 inches |
| Overall rod diameter | 1.125 inches |
| Angle between face of disc and geometric axis of rod | 48° 39.5' |
| Thickness of each disc | 0.250 inches |
| Number of right-hand discs | 18 |
| Number of left-hand discs | 18 |
| Spacing between discs | 0.025 inches |
| Angle between outer face 78 and geometric axis of prism 46 | 57° 16' |
| Angle between inner face 76 and prism 46 and geometric axis of prism | 52° 20' |

Utilizing a Pockels cell arrangement, the above-described laser apparatus can be used for energy levels up to 60 kilowatts at 5 pulses per second and 12 kilojoules per pulse.

FIG. 6 illustrates a modified embodiment of a laser apparatus utilizing a key and slot to maintain the laser discs in their preselected orientation. More specifically, the left-hand laser discs 118 and the right-hand laser discs 116 are identical to the discs 16 and 18 with the exception that a key slot 86 is provided in the top surface of each disc. The key slot may be provided in the discs while the discs are still in rod form, as noted hereinabove. A key 88 is provided which is adapted to be received in the key slot 86. The key 88 may be fabricated from the dame material as the cladding 22 of the respective discs. Additionally, a key slot 90 is provided in the prism 146. It is to be noted that the prism 146 is identical to the prism 46 with the exception that the prism 146 has a key slot 90. The key 88 is adapted to be received in the slot 90.

The slots 86 and 90 are positioned so that when the key is received therein, the laser discs 116 and 118 and the prism 146 will be correctly aligned with respect to each other and the geometric axis of the complete laser array comprising the discs and the prisms.

While preferred embodiments of the invention have been shown and described herein, it will be understood that numerous omissions, changes and additions may be made in such embodiments without departing from the spirit and scope of the present invention.

What is claimed is:

1. A segmented laser apparatus comprising an outer jacket having an inner wall defining a through bore, a plurality of laser discs in said bore, spacing means between adjacent ones of said plurality of discs for maintaining said discs in spaced relationship to each other, opposite edges of alternate ones of said plurality of discs being spaced from said wall to define alternating fluid paths therebetween whereby serial fluid flow is obtained through said jacket, and retaining means received in at least one end of said jacket for retaining said plurality of laser discs therein.

2. A segmented laser apparatus as in claim 1, in which said retaining means comprises fluid conduit means for providing a passage for the flow of fluid through said jacket.

3. A segmented laser apparatus as in claim 1, in which said retaining means includes prism means comprising a prism having a first face extending beyond the edge of said jacket and angulated at the Brewster angle determined by the prism and a fluid adapted to be in contact with said first face, and a second face received within said jacket and angulated at the Brewster angle determined by said prism and the fluid within said jacket, said prism means further comprising a prism holder having a through bore adapted to receive said prism therethrough, the diameter of said prism holder through bore being slightly in excess of the diameter of said prism whereby an annular fluid passage is formed therebetween, means in said prism holder for providing for the flow of a fluid to said annular passage, a radially extending flange on said prism, a shelf in said prism holder adapted to provide a seat for said flange, and sealing means between said shelf and said flange.

4. A segmented laser apparatus as in claim 1, in which said retaining means comprises stop means including a stop and readout pilot having a rear edge at a preselected angle and engaging the adjacent one of said plurality of laser discs to maintain said plurality of laser discs at said preselected angle, a lockring connected with said stop and readout pilot, prism means received in said lockring for providing a path for the transmission of energy and a fluid to said plurality of discs, sealing means between said lockring and said prism means for sealingly engaging said jacket, and at least a groove in said stop and readout pilot to provide for the flow of a fluid from said prism means to said jacket through said bore.

5. A segmented laser apparatus as in claim 1, in which a retaining means is received in each end of said jacket, whereby said laser apparatus may be handled as a solid laser apparatus.

6. A segmented laser apparatus comprising an outer jacket having an inner wall defining a through bore, a plurality of laser discs in said bore portions of which are in sliding engagement with said wall, each of said discs comprising an active portion operable to transmit energy and an inactive portion, spacing means engaging the inactive portion of each of said plurality of discs for maintaining said discs in spaced relationship to each other, fluid passage means in said jacket for providing a path for the flow of fluid therethrough, and retaining means received in the respective ends of said jacket for retaining said plurality of discs in said jacket, said inactive portion of each of said plurality of discs comprising an inner active portion fabricated from a laser material and the inactive portion of each of said plurality of discs comprising a surrounding inactive cladding portion.

7. A segmented laser apparatus as in claim 6, wherein cladding portions on opposite edges of adjacent discs are in spaced relationship to said inner wall of said jacket to define a portion of said fluid passage means therebetween to produce a serial flow of fluid through said jacket.

8. A segmented laser apparatus as in claim 6, in which said spacing means comprises a plurality of bores in the cladding portion of at least a face of each disc, and a respective pin received in each one of said plurality of bores and extending therebeyond to engage the adjacent disc.

9. A segmented laser apparatus as in claim 8, in which the external ends of the pins associated with each disc are coplanar.

10. A segmented laser apparatus as in claim 8, in which said plurality of bores comprise three bores spaced about the active portion of said discs.

11. A method for producing laser discs for a segmented laser apparatus comprising forming a laser rod having an active inner laser portion and a surrounding cladding portion to a preselected diameter, removing a portion of the circumference of said rod to provide a relieved surface, cutting said rod into a plurality of discs at an angle to the axis of the rod as determined by the indices of refraction of the active portion of said rod and the fluid in which the discs are to be placed, polishing opposed faces of each of said plurality of discs, providing spaced bores in said cladding portion of each disc face, and inserting spacing pins in each bore.

12. The method of claim 11, including the further step of making the ends of said pins coplanar.

13. The method of claim 11, in which said removing step comprises mounting said rod off-center, and grinding said rod to provide said relieved surface.

14. A method of producing a segmented laser apparatus comprising providing an outer jacket with a through bore, forming at least a first and a second laser rod each having an active inner laser portion surrounded by an inactive cladding portion to a preselected diameter, removing opposed portions of the respective circumferences of said first and second laser rods to provide opposed relieved surfaces on said laser rods, cutting said first and second laser rods at an angle with respect to the axis of the respective rods as determined by the indices of refraction of the active portion of said rod and the fluid in which the discs are to be placed to provide a plurality of first discs and a plurality of second discs, polishing opposed faces of each of said discs after cutting said discs, placing spaced bores in the cladding portion on the face of each of said discs, inserting pins into said bores to provide spacers between adjacent discs, grinding and polishing the ends of said pins in each of said discs until said pin ends are coplanar, sequentially inserting said first and second discs into said jacket bore, and applying opposed compressive forces to said discs in said bore to bring said discs into rotational alignment.

15. The method of claim 14, including the step of closing the open ends of said jacket bore to maintain said discs in place.

16. The method of claim 14, in which said removing step comprises mounting said first rod off-center in one direction and grinding said first rod to obtain said relieved surface, and mounting said second rod off-center in a second direction and grinding said second rod to obtain said opposed relieved surface.

* * * * *